United States Patent [19]
Shimek et al.

[11] Patent Number: 5,941,237
[45] Date of Patent: Aug. 24, 1999

[54] UNIVERSAL NON-POROUS FIBER REINFORCED COMBUSTION CHAMBER FIREPLACE

[75] Inventors: Ronald John Shimek, Prior Lake; Daniel Curtis Shimek, Apple Valley, both of Minn.

[73] Assignee: Heat-N-Glo Fireplace Products, Inc., Savage, Minn.

[21] Appl. No.: 08/588,866

[22] Filed: Jan. 19, 1996

[51] Int. Cl.[6] .................................. F23M 5/00; F24C 3/00
[52] U.S. Cl. ............................................ 126/512; 126/144
[58] Field of Search .................................... 126/500, 572, 126/144, 8

[56] References Cited

U.S. PATENT DOCUMENTS

| | | | |
|---|---|---|---|
| 2,104,254 | 1/1938 | Fogerty et al. | 126/8 |
| 3,100,734 | 8/1963 | Rex, Jr. et al. | 126/144 |
| 3,213,917 | 10/1965 | Scheppers | 126/144 |
| 4,433,523 | 2/1984 | Miedaner et al. | 126/144 |
| 5,186,161 | 2/1993 | Shumock | 126/500 |

FOREIGN PATENT DOCUMENTS

| | | | |
|---|---|---|---|
| 2593269 | 7/1987 | France | 126/500 |
| 2636410 | 3/1990 | France | 126/144 |
| 3032601 | 5/1981 | Germany | 126/500 |
| 3125833 | 4/1983 | Germany | 126/8 |
| 7703284 | 9/1978 | Netherlands | 126/500 |
| 2257783 | 1/1993 | United Kingdom | 126/512 |

*Primary Examiner*—Carl D. Price
*Attorney, Agent, or Firm*—John B. Sowell

[57] ABSTRACT

The present invention includes a universal combustion chamber preferably shipped from a factory as a separate unit for field installation into a plurality of different fireplace units and includes a top panel and a floor panel connected to sidewall panel to form a complete ready to use gas tight structure. The combustion chamber is fabricated from flat and/or curved panels which are preferably molded from a thick paste slurry of mixed vitreous alumina silicate fibers combined with an aqueous solution of silica binder and fired to form non-porous gas tight panels which are interconnected to form a gas tight combustion chamber. The connecting joints are preferably reinforced by the addition of a high temperature adhesive added to the mating joints. The joints may be further reinforced and/or sealed by mechanical reinforcing at or in the joints. The joints may be eliminated by forming a one piece combustion chamber on forming molds that are designed to be separated from a formed but uncured combustion chamber.

18 Claims, 6 Drawing Sheets

UNIVERSAL NON-POROUS FIBER REINFORCED COMBUSTION CHAMBER FIREPLACE

BACKGROUND OF THE INVENTION

1. Field of the Invention

The present invention relates to a universal combustion chamber useful for installation in metal fabricated fireplaces or a stand alone combustion chamber. More particularly, the present invention relates to an assembled non-porous cast fiber-reinforced combustion chamber that is machinable in its cured stage and moldable in its uncured preformed stage.

2. Description of the Prior Art

Heretofore, panels made from high temperature ceramic materials were known. Heat-N-Glow of Savage, Minn. has incorporated high temperature ceramic panels under the gas burners of some of their gas fireplaces in the form of loose panels. Heat-N-Glow has also incorporated both refractory firebrick and cast ceramic blocks or panels in numerous stoves and fireplaces for insulation purposes as well as for aesthetic purposes.

Manufacturers of commercial and home heating systems have employed cast refractory fireboxes in the base of furnaces. Such refractory fireboxes are protected against exhaust leakage because they are placed in an area where leakage would not escape from the furnace or boiler or are completely backed up by another non-porous sheet or wall.

Unvented or non-vented gas heaters and fireplaces are not concerned with preventing escape of burned exhaust gasses into a living area, thus, do not totally enclose the combustion chamber or burners. Such unvented gas stoves have been known to deplete the oxygen supply in a living area.

Applicants are not aware of any gas fireplace which employs a gas combustion chamber that virtually eliminates the need for any fireplace enclosure or shroud around the gas combustion chamber for heat protection.

It would be desirable to provide a universal combustion chamber which would accommodate a variety of gas burners and a variety of vents. It would further be desirable to provide an assembled leak proof combustion chamber made from non-porous cast fiber reinforced moldable and machinable material that is cool enough at its outer surface to be installed without additional insulation or heat protective barriers on the outside of the combustion chamber.

SUMMARY OF THE INVENTION

It is a principal object of the present invention to provide an assembled gas fireplace combustion chamber that comprises a plurality of non-porous cast fiber reinforced panels.

It is another principal object of the present invention to provide a fabricated kit of non-porous cast fiber reinforced panels that are accurately formed to be assembled into a leak proof fireplace combustion chamber.

It is another principal object of the present invention to provide an assembled prefabricated non-porous cast fiber reinforced combustion chamber that is machined and ready for installation of a gas burner.

It is another principal object of the present invention to provide a plurality of assembled or unassembled machined non-porous cast fiber reinforced panels that when assembled form a combined combustion chamber and fireplace ready for completion by addition of a gas burner and/or a gas vent.

It is yet another object of the present invention to provide a universal gas combustion chamber/fireplace unit that does not require a metal enclosure for operation in a fireplace.

It is yet another principal object of the present invention to provide a universal gas combustion chamber/fireplace unit that is operable with a gas burner and has an outer wall temperature cool enough to meet standards for zero clearance installations.

It is another object of the present invention to lower the cost of manufacturing gas fireplace units while increasing their efficiency by combining the functions normally associated with a separate gas combustion chamber and fireplace enclosure.

According to these and other objects of the present invention there is provided a universal gas combustion chamber of the type having a bottom floor panel, a top panel and vertical side panels assembled to form a fireplace when a gas burner is installed in or on the floor panel. Said gas combustion chamber panels being made from a moldable slurry of refractory ceramic fibers (preferably vitreous alumina silicate fibers) and a binder (preferably amorphous silica) to form strong machinable fiber reinforced panels.

DETAILED DESCRIPTION OF THE PREFERRED EMBODIMENTS

Figure 1:
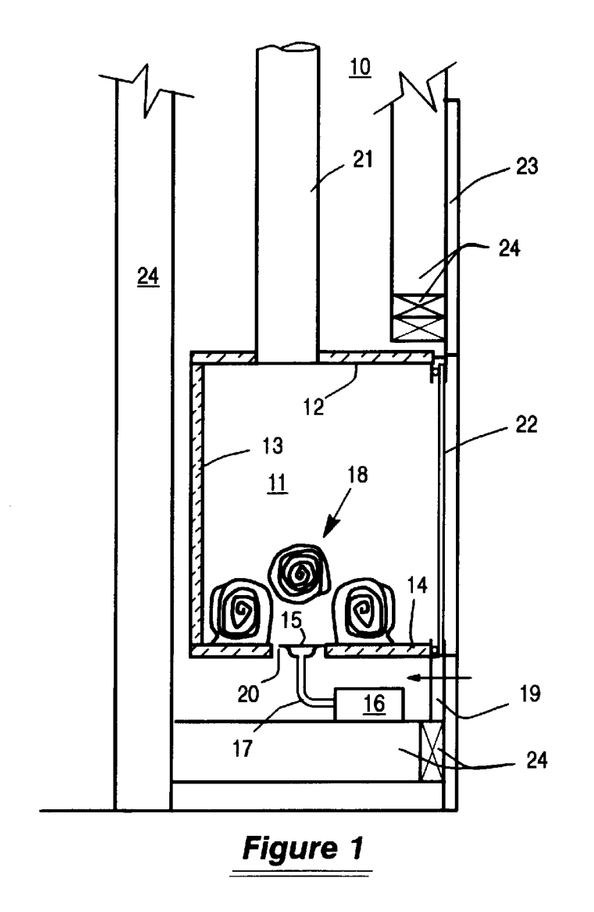
FIG. 1 is a section in side elevation taken through a novel assembled non-porous cast ceramic fiber combustion chamber having a burner opening in the floor panel and an exhaust opening in the top panel and installed flush mounted as a vented gas fireplace.

Refer now to FIG. 1 showing a vented gas fireplace unit 10 in side elevation taken through the novel assembled non-porous cast ceramic fiber combustion chamber 11. The combustion chamber 11 comprises a top panel 12, a rear panel 13 and a bottom or floor panel 14. The floor panel 14 is provided with an aperture 20 in which a flat pan gas burner 15 is placed either below or at the surface of the floor panel 14. The flat pan burner 15 is shown connected to a gas valve 16 via a gas connection pipe 17. Air for combustion at the gas burner 15 enters through the louvered cover 19 and passes as burning gas around the logs 18 and is exhausted through the exhaust stack 21. A glass front panel 22 may be provided on the vented gas fireplace unit 10 or may be removed if so desired. A decorative surround panel 23 formed as a simulated brick mantel piece is mounted directly to the studs 24 which are used to form a chase or enclosure around the combustion chamber.

Figure 2:
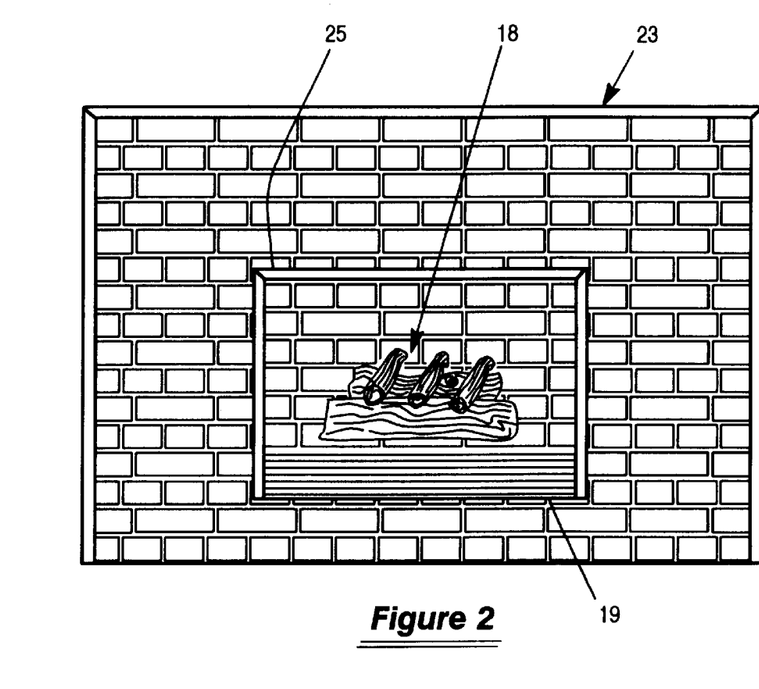
FIG. 2 is a front view of the vented fireplace shown in FIG. 1 showing a decorative surround with a simulated brick pattern which compliments the pattern in the interior of the non-porous cast ceramic combustion chamber.

Refer now to an enlarged front view of the vented fireplace 10 shown in FIG. 1. The decorative surround panel 23 is provided with an aperture in which the combustion chamber 11 is placed. The combustion chamber 11 is further provided with a decorative brass trim 25 which complements the surround panel 23. The panel 13 in the back and side of the combustion chamber 11 is shown having a simulated brick embossed surface which complements the surround panel 23.

Figure 3:
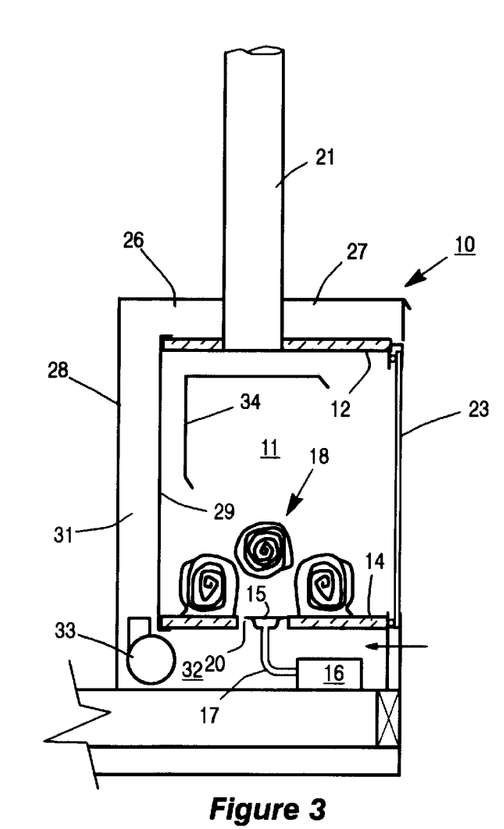
FIG. 3 is a section and side elevation taken through a modified assembled ceramic combustion chamber having a metal rear panel and a fireplace enclosure which forms a heat exchanger around the bottom, back and top of said combustion chamber.

Refer now to FIG. 3 showing a side elevation taken through a modified assembled ceramic combustion chamber which has a metal rear panel 29. The metal rear panel and the rear panel 28 of a fireplace enclosure form a heat exchanger rear wall 31. A similar heat exchanger wall 27 is formed between the top panel 12 and the top metal panel of the fireplace enclosure 26. A bottom heat exchanger wall 32 is formed between the bottom or base of the fireplace unit 10 and the bottom or floor panel 14. A blower 33 is installed in the bottom wall 32 of the fireplace unit and moves air from the outside room through walls 32, 31 and 27 to form a heat exchanger for the combustion chamber 11. A baffle 34 is shown in installed in the upper and rear portion of the combustion chamber 11 to increase the exhaust gas flow and efficiency to the heat exchanger.

Figure 4:
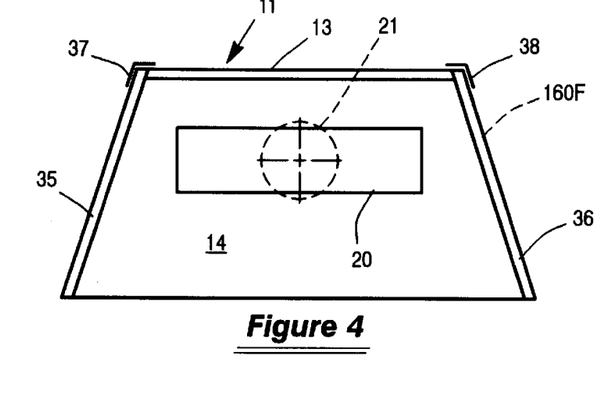
FIG. 4 is diagrammatic drawing in sectional plan view of the combustion chamber of FIG. 1.

Refer now to FIG. 4 showing a diagrammatic drawing in sectional plan view of the combustion chamber 11 of FIG. 1. The aforementioned rear panel 13 and the side panels 35 and 36 are preferably made from a non-porous cast fiber reinforced insulating material which will be described in greater detail hereinafter. The combustion chamber 11 is shown assembled from panels 13, 35 and 36 and the floor panel 14 before the top panel 12 is assembled and not shown. Corner brackets 37 and 38 are preferably provided at the sharp edges of the combustion chamber 11 to provide corner reinforcements. The corner brackets 37 and 38 are preferably attached to the combustion chamber 11 with high temperature adhesives. However, it will be understood that ordinary silicon caulking compound which is durable up to 500 degrees Fahrenheit may also be used as an adhesive to attach the corner brackets 37 and 38. The aperture 20 through which the flat pan burner 15 is installed is shown in the rear and center of the combustion chamber 11. It will be understood that other types of apertures and other types of burners may be used within the universal combustion chamber 11 as will be explained hereinafter.

Figure 5:
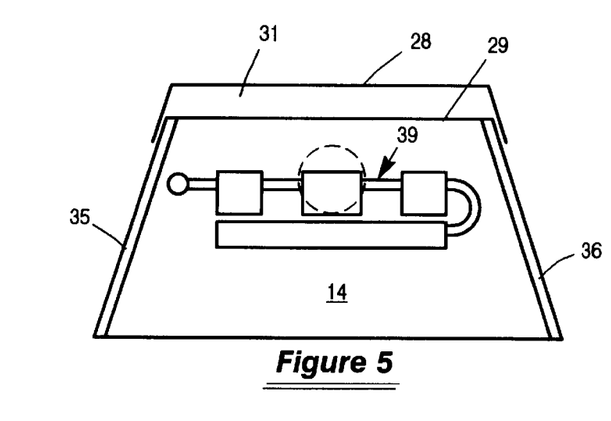
FIG. 5 is a diagrammatic drawing in sectional plan view of a combustion chamber of FIG. 3 showing a two-level gas pipe gas burner therein.

Refer now to FIG. 5 showing a diagrammatic drawing in sectional plan view of the combustion chamber of FIG. 3. The combustion chamber 11 in this drawing is shown provided with a two-level pipe burner 39 and an appropriate aperture for a combustion gas pipe will be provided in the floor or bottom panel 14. The side walls 35 and 36 are preferably abutted against the rear panel 29 of the heat exchanger and is overlapped by the back panel 28 or the back wall of the fireplace enclosure 28. These panels may be attached with high mechanical fasteners because the heat which passes through the panel 29 is intended to be hot enough to serve as a heat exchanger for the back wall 31 as explained hereinbefore.

Figure 6:
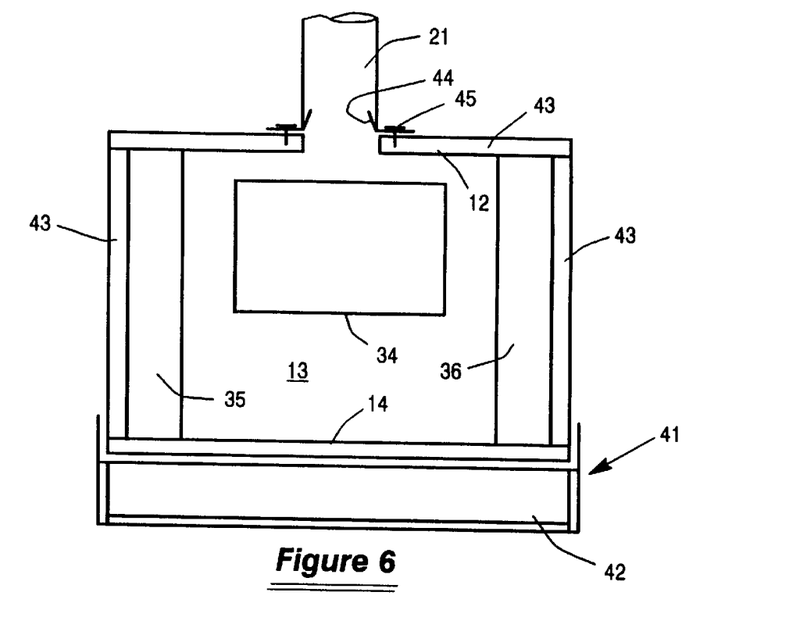
FIG. 6 is a front view of a vented fireplace comprising the novel ceramic combustion chamber and a fabricated metal base support.

Refer now to FIG. 6 showing a front view of a vented fireplace which comprises the aforementioned novel ceramic combustion chamber 11 which comprises two side walls 35 and 36, a top wall 12, a bottom wall 14 and a rear wall 13. The edges of the aforementioned walls 43 are shown exposed but may have attached thereto either decorative trim or surround pieces as described hereinbefore. The combustion chamber 11 is further provided with a fabricated metal base 41 onto which a trim piece or closure piece 42 is attached. A baffle 34 is installed in the combustion chamber 11 and supported therefrom by means not shown. The stack 21 is shown attached to the combustion chamber by means of a collar 44 and screws 45. It will be understood that the fiber reinforced ceramic material is thick enough and dense enough to accept conventional screws for attachment purposes.

Figure 7:
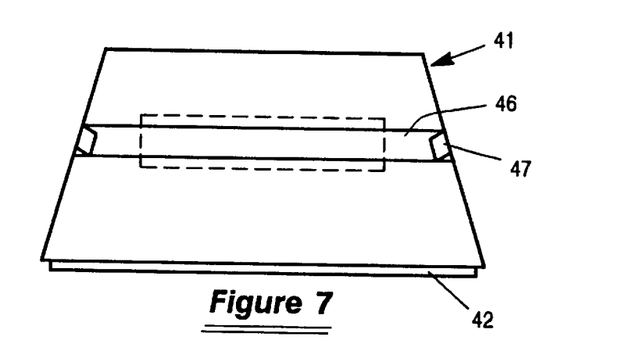
FIG. 7 is a diagrammatic drawing in plan view showing the base support of FIG. 6.

Refer now to FIG. 7 showing a diagrammatic drawing in plan view of the base support 41. The base support 41 is preferably formed from a single piece or three pieces of sheet metal to form an enclosure or surround which nests at the outer edges of the floor or bottom panel 14. In the preferred embodiment of the present invention, a transverse support bar 46 is provided between the two side panels of the base support 41 and used to support the aforementioned gas valve 16 and flat pan burner 15.

Figure 8:
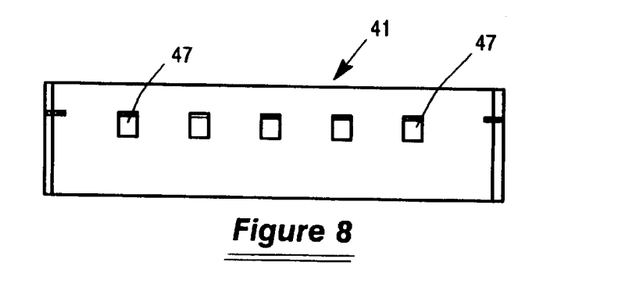
FIG. 8 is a front view of the base support of FIGS. 6 and 7 with the front trim panel and transfer support bar removed.

Refer now to FIG. 8 showing a front view of the base support 41 and support tabs 47 which are formed by piercing tabs from the panel metal and diverting it from a vertical axis into a horizontal axis by bending the tab inward. The front of the metal base 41 may be closed by the trim piece 42 or the trim piece 42 may be made in the form of a louver for access air. However, by making the tabs 47 from the parent panel metal, air is capable of passing through the apertures made when the support tabs are formed.

Figure 9:
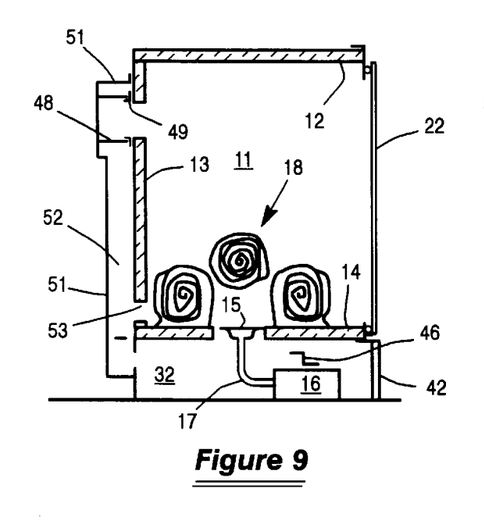
FIG. 9 is a section in side elevation taken through a modified assembled ceramic combustion chamber completed for installation as a horizontal vented zero clearance fireplace.

Refer now to FIG. 9 showing a section in side elevation through a modified assembled ceramic combustion chamber 11 which is completed for installation as a horizontal direct vented zero clearance fireplace. The numerals used in the previous figures which are substantially the same as those employed in FIG. 9 are number the same and do not require additional description. The fireplace 11 is shown provided with a horizontal stack 48 which is adapted to fit onto the rear of the rear panel 13 of the combustion chamber 11 by a collar 49. Surrounding the collar 49 is a combustion air chamber 51 which extends downward along the back of the rear panel 13 and forms a plenum 52 for providing a fresh air passageway into the bottom of the combustion chamber through either into the wall 32 or through an aperture 53 into the combustion chamber 11. It will be understood that the plenum 52 shown along the back of the rear panel 13 may be formed as a duct which enters the bottom or the sides of the combustion chamber 11 but still forms a duct for communicating fresh combustion air into the combustion chamber.

Figure 10:
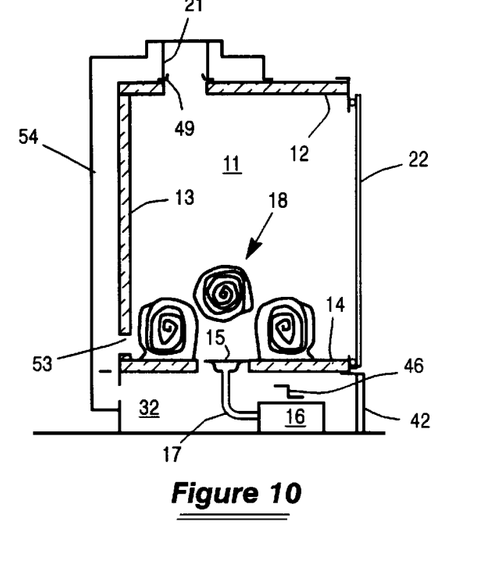
FIG. 10 is a section in side elevation taken through a modified assemble ceramic combustion chamber completed for installation as a vertical vented zero clearance fireplace.

Refer now to FIG. 10 showing a side elevation taken through a modified assembled ceramic combustion chamber completed for installation as a vertical zero clearance fireplace. The aforementioned plenum 52 is shown as a plenum 54 which also passes down the rear of the rear panel 13 of the combustion chamber 11 and communicates with the rear or bottom of the combustion chamber 11 at panel 14. In the preferred embodiment of the present invention, it is desired to bring the fresh combustion air down below the floor panel 14 and to permit it to rise along the edges of the flat pan burner 15 so as to effect a more complete combustion and flame color around the decorative logs 18. The vertical stack 21 is adapted to the combustion chamber 11 by a collar 49 and the plenum or passageway 54 is formed from sheet metal and attached to the top and rear of the panels 12 and 13 of the combustion chamber 11. The numerals in the FIG. 10 are the same as those employed in FIG. 9 and do not require additional explanation.

Figure 11:
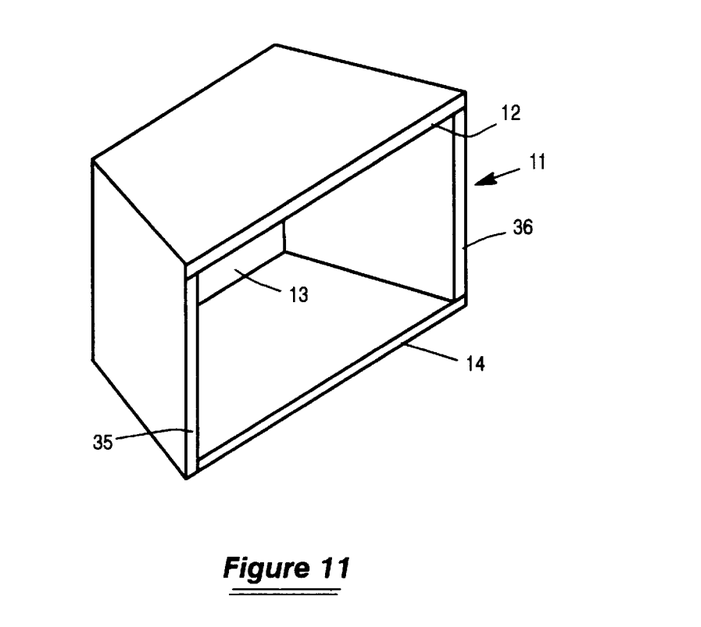
FIG. 11 is a diagrammatic isometric view of the novel assembled non-porous cast ceramic combustion chamber before modification for use as an unvented fireplace, a vented fireplace or a direct vented fireplace with or without a heat exchanger modification.

Refer now to FIG. 11 showing an isometric view of a novel assembled non-porous cast ceramic combustion chamber 11 before modification for use as an unvented fireplace or as a vented fireplace or as a direct vented fireplace with or without a heat exchanger modification.

The novel combustion chamber shown in FIG. 11 is preferably made from an alumina silicate fiber solution, or an equivalent, with a binder and mixed to agitate the fibers to absorb the solution. Once the mixture of fibers forms a slurry as thick as a paste, it may be molded into any desired shape. The trapezoidal flat panel shape shown in FIG. 11 is a preferred embodiment. However, the top and bottom panels may be made as a segment of a circle and the side walls 35, 36 and 13 may be made as a continuous curved panel. In any event, it is desired that the novel combustion chamber 11 be assembled from at least three pieces. The advantage to employing substantially flat panels is to enable one to ship the novel gas combustion chamber in a knock down kit easily packaged package for a minimum of transportation cost.

When the fireplace chamber 11 shown in FIGS. 1 to 5 and 11 is molded as a one piece unit on a forming mold, care must be taken so that the uncured combustion chamber is not distorted. This is preferably accomplished by pre-drying on the mold before stripping the unit from the mold. This permits sealing or spraying before final drying.

Figure 12:
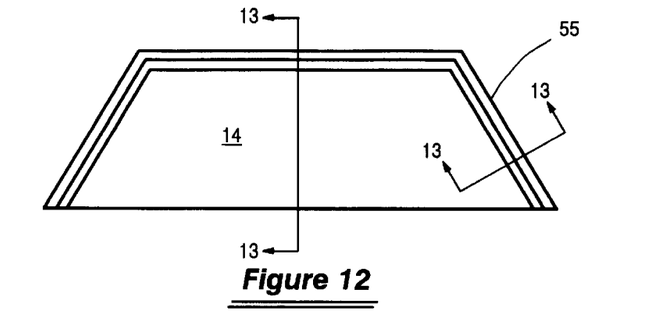
FIG. 12 is a plan view of a floor or top panel of a novel ceramic combustion chamber illustrating a second preferred embodiment panel.

Refer now to FIG. 12 showing a plan view of a floor or top panel of a novel ceramic combustion chamber illustrating a second preferred embodiment panel. The panel 14 shown in FIG. 12 is provided with grooves 55 which will accept and precision locate the aforementioned side panels 35, 36 and the rear panel 13.

Figure 13:
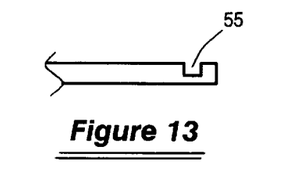
FIG. 13 is a section taken at lines 13—13 of FIG. 12.
Figure 14:
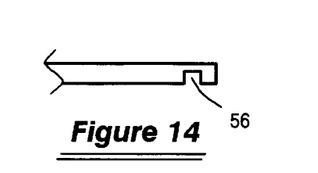
FIG. 14 is a section as it would appear if taken at lines 13—13 through a top panel when reverse oriented.

Refer now to FIG. 13 showing a section taken at lines 13—13 of FIG. 12 and showing the aforementioned groove 55 which will accept a side panel 36 and precision locate it therein. Similarly, a groove 56 is shown in FIG. 14 which is identical to the groove 55 shown in FIG. 13. When the panel 14 is reversed 180 degrees, the groove on the left side of the lower panel becomes the groove on the right side for the upper panel.

Figure 15:
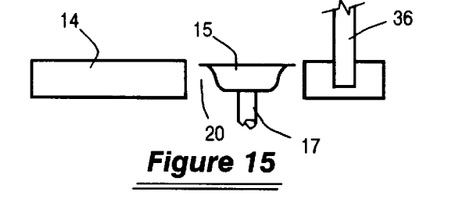
FIG. 15 is an enlarged section in elevation taken through a floor panel showing a preferred metal flat pan burner.

Refer now to FIG. 15 showing an enlarged section in elevation taken through a floor panel 14 showing a preferred embodiment metal flat pan burner 15 located in an aperture 20 which is preferably formed by cutting dies.

Figure 16:
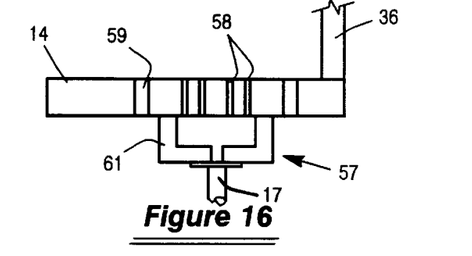
FIG. 16 is an enlarged and section in elevation taken through a floor panel showing a non-porous ceramic flat pan burner.

Refer now to FIG. 16 showing an enlarge section in elevation taken through a floor panel 14 showing a non-porous ceramic flat pan burner 57 formed by drilling gas port apertures 58 into the floor panel 14 and providing air access slots 59 adjacent thereto. In the preferred embodiment shown in FIG. 16, the lower portion of the flat pan burner is formed by non-porous ceramic fiber reinforced material the same as a metal flat pan burner and the bottom portion 61 has the same interior spacing as a flat pan burner 15 so as to provide the same gas distribution within the flat pan burner as before. The lower portion of the flat pan burner 57 is preferably attached to the lower or bottom panel 14 by mechanical attachment means as well as adhesives.

Figure 17:
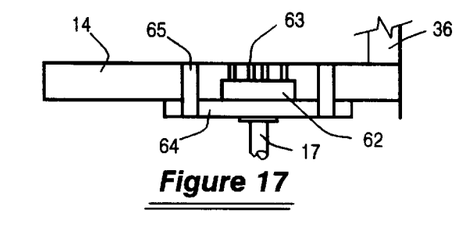
FIG. 17 is an enlarged section in elevation taken through a floor panel showing another non-porous ceramic flat pan burner.

Refer now to FIG. 17 showing an enlarged section in elevation taken through a floor panel 14 which has machined therein the interior dimensions of a flat pan burner 15 shown as the area 62. Gas ports 63 are drilled or punched in the panel 14 opposite the lower pan portion 64 which is attached to the bottom panel 14 by mechanical and adhesive means and provided with air slots 65 extending through both parts 64 and 14.

Figure 18:
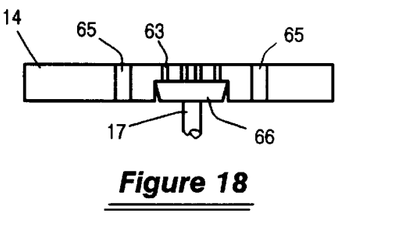
FIG. 18 is an enlarged section in elevation taken through a floor panel showing a composite metal/non-porous ceramic flat pan burner.

Refer now to FIG. 18 showing an enlarged section in elevation taken through a floor panel 14 showing a composite metal and non-porous ceramic flat pan burner. The upper portion of the flat pan burner is similar to that described with reference to FIG. 17 and is provided with gas ports 63 which communicate with a lower metal pan portion of a gas pan burner 66. Air slots 65 are provided through the panel 14 to provide combustion air for the burner 66.

Figure 19:
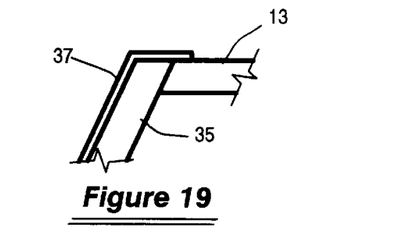
FIG. 19 is an enlarged detail of a vertical joint formed by a side and a rear panel of a ceramic combustion chamber having three vertical panels.

Refer now FIG. 19 showing an enlarged detail of a vertical joint formed by a side panel 35 and a rear panel 13 held together by a corner support bracket 37 which is preferably attached with a high temperature adhesive or even a silicone caulking compound.

Figure 20:
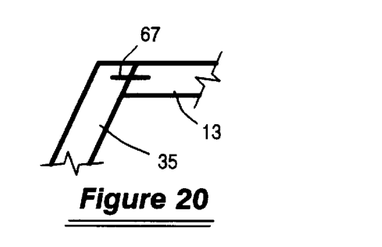
FIG. 20 is an enlarged detail of a another vertical joint formed by a separate side and rear panel.

Refer now to FIG. 20 showing in enlarged detail of another vertical joint formed by a side panel 35 and a rear panel 13 which are held together by a reinforcing spline 67. Again, it is preferred that the panels be closed with a high temperature cement to assure that they are exhaust gas leak proof.

Figure 21:
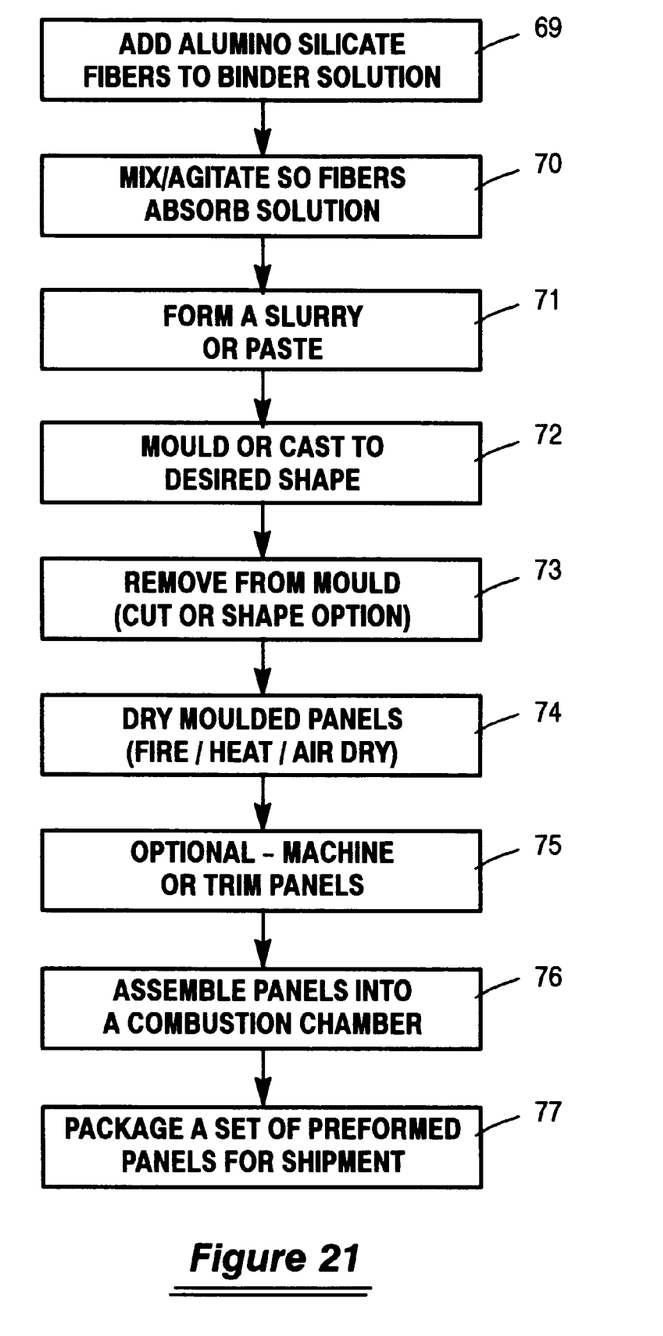
FIG. 21 is a block diagram showing the steps preferably employed to form the panels used in the novel gas combustion chamber described in the Figures hereinbefore.

Refer now to FIG. 21 showing a block diagram of the steps employed to make a moldable and castable slurry or paste of reinforced ceramic fibers used to make panels which are used to assemble the novel universal gas combustion chambers. In block 69 fibers of alumina silicate are mixed with a binder solution which is in aqueous form. The preferred aqueous solution is a binder of amorphous silicate which may be purchased from Nalco Chemical Company in Naperville, Ill. under the designation Nalco 1140. The high temperature reinforced fibers preferably are made from a mixture of silica and alumina ($SiO_2$ and $Al_2O_3$) which are mixed and then melted and formed as fibers by blowing drops or portions of the melted mixture to form fibers that are graded by length and preferably are in a form of ½ to 1½ inches in length when mixed with amorphous silica. After the combination of fibers and binder solution are mixed together, they are agitated so that the fibers completely absorb the binder solution as shown in block 70. After the mixing and agitation occurs, a slurry or paste is formed as shown in block 71 which is of a consistency which permits pouring or filling into molds or casting receptacles. The slurry or paste is then molded or cast or formed into this desired shape as shown in block 72. The molding and casting of a desired shape of the paste may be formed on a continuous line in a flat panel form in which case the material is passed into a drying oven and would not require removal from a mold as shown in block 73. The step performed at block 73 could be a progressive stamping mold or a rotary mold. After the material passes from the molding or casting operation at block 73, it is dried as molded panels by firing or by holding in heated molds to dry off the water from the green paste mold. In the preferred embodiment, firing is accomplished at temperatures between 350 degrees Fahrenheit up to 1800 degrees Fahrenheit to drive off the water solution which comprises up to 25% by weight.

After drying or firing the panels at block 74, the panels are trimmed or machined to a preliminary shape or trimmed or machined to a final shape at block 75. Apertures and slots and gas ports and burners are formed therein, depending on the intended use of the panel. It will be appreciated that in some forms of individual molds, the edges of the dried panels are so precise that they do not require machining when being fitted together to form an assembled gas combustion chamber. After forming the desired panels in the desire shapes with the desired slots, holes and burners which may be formed by drilling or punching, the panels may be assembled into a combustion chamber shown in block 76 if the production operation is a continuous operation. However, if the panels to be assembled into a combustion chamber are for assembly at a production site or installation site, it is preferred that individual kits be manufactured from which assembled combustion chambers may be made on site to assure minimum damage and minimum cost of shipping. Thus, the desired panels for a particular preformed gas combustion chamber are packaged as a set of preformed parts for shipment as shown in block 77.

Having explained a preferred embodiment of the present invention used in several different types of fireplaces, it will be appreciated that use of a universal combustion chamber greatly reduces the factory inventory as well as the field site inventory of combustion chambers. The fired and dried fiber reinforced combustion chamber is slightly hydroscopic but non-porous to exhaust gases and may be sealed without a steel or reinforcing backing layer even when used for burning wood logs. The reinforced panel can be made thicker and stronger for wood logs so as to meet wood stove standards and impact tests performed by underwriters as well as meeting zero clearance outside temperature of 160° F. if needed.

Manufacturers of Refractory Ceramic Fibers (RCFS) and aqueous binders publish data sheets on several different RCF. While the exact formulation may differ, the preferred silicate base is vitreous alumina silicate for making high temperature ceramic fibers. An equivalent silicate fiber would be operable when combined with a compatible RCF binder.

What is claimed is:

1. A method of making a universal gas combustion chamber for use in a plurality of different prefabricated gas fireplace units, comprising the steps of:

mixing refractory ceramic fibers (RCFs) with a solution of inorganic binder to form a thick paste slurry, molding said thick paste slurry into an open box shape fireplace having a plurality of panels comprising a floor panel, at least two side panels and a top panel, removing said open box fireplace from its mold, firing said panels to form a non-porous impact resistant open box of panels of a gas fireplace combustion chamber, assembling stack means, trim means, burner means and said plurality of panels into the gas fireplace combustion chamber to provide said different gas fireplace units, and sealing the joints between said stack means and said trim means, to form unique fireplace units having a reinforced non-porous gas tight gas combustion chamber.

2. A method as set forth in claim 1 wherein the step of sealing further comprises applying a binder which comprises an aqueous solution of inorganic binder.

3. A method as set forth in claim 2 which further includes the step of machining flanges on the box opening for attaching said trim means to at least one of said panels.

4. A method as set forth in claim 1 wherein said step of molding comprises providing an opening in at least one of said panels forming an exhaust stack aperture in said top or back panel.

5. A method as set forth in claim 4 wherein said step of assembling said burner means includes making an opening in at least one of said panels which comprises gas burner port apertures in said floor panel.

6. A method as set forth in claim 1 which further includes the steps of, providing flanges on said top panel and said floor panel, providing flanges on said side panels, and the step of assembling said fireplace further comprises attaching said trim means to said flanges and door means to said trim means to complete said non-porous gas tight combustion chamber.

7. A method as set forth in claim 1 wherein said open box shaped fireplace comprises at least one substantially flat steel back panels, and overlapped the mating edges of said steel panel to other panels to form a gas tight heat exchanger panel.

8. A universal open box combustion chamber for use in a plurality of different types of fireplaces comprising, a floor panel, a top panel, two side panels, said floor panel, said top panel and said side panels each comprising a mixture of vitreous alumina silicate fibers and an aqueous solution of binder formed and dried after molding to provide a gas tight and impact resistant box of panels of a fireplace combustion chamber, glass door means attached to said panels to provide a gas tight closed box fireplace, and burner means supported by said floor panel.

9. A universal combustion chamber as set forth in claim 8 wherein said burner means is supported above said floor panel, and apertures in said side and floor panels for connecting air and gas to said burner means.

10. A universal combustion chamber as set forth in claim 8 wherein said burner means comprises a single open U-shaped panel adapted to seal against said floor panel.

11. A universal combustion chamber as set forth in claim 8 which further comprises a plurality of flat back panels sealed at their mating joints to other panels to form a gas tight combustion chamber.

12. A universal combustion chamber as set forth in claim 8 wherein said burner means comprises connecting panels having flat mating joints, and a self hardening high temperature adhesive applied in said joints of said burner means to further assure a gas tight seal.

13. A universal combustion chamber as set forth in claim 11 which further includes corner reinforcing means attached to corners of said sidewall panels.

14. A method of making a universal gas combustion chamber for use as a component of a fireplace unit, comprising the steps of:

mixing vitreous alumina fibers with an aqueous solution of inorganic binder to form a thick castable slurry, forming said thick castable slurry on a forming mold to build up a desired predetermined thickness non-rigid fireplace combustion chamber having an open side for supporting door means and a floor for supporting a gas burner, drying said formed combustion chamber on the mold to provide an uncured stiff one piece combustion chamber, stripping away the forming mold, and heating said uncured one piece combustion chamber at firing temperature to form a rigid non-porous impact resistant combustion chamber ready for assembly of said door means and gas burner to form a unique fireplace.

15. The method as set forth in claim 14 which further includes the steps of forming pluggable aperatures in the side or top panels for attachment of an exhaust stack.

16. The method as set forth in claim 14 which further includes the steps of supporting a gas burner unit on the floor panel, and providing apertures in said fireplace unit through which fresh air for combustion is conducted to said gas burner.

17. The method as set forth in claim 16 which further includesattaching door means to said open side of said combustion chamber.

18. The method as set forth in claim 17 wherein the step of attaching door means comprises the step of sealing a glass door panel to the vertical and horizontal edges of said open side of said fireplace combustion chamber.

* * * * *